March 27, 1928.
H. A. DENMIRE
1,664,163
TIRE FINISHING MACHINE
Filed Jan. 6 1926   2 Sheets-Sheet 1
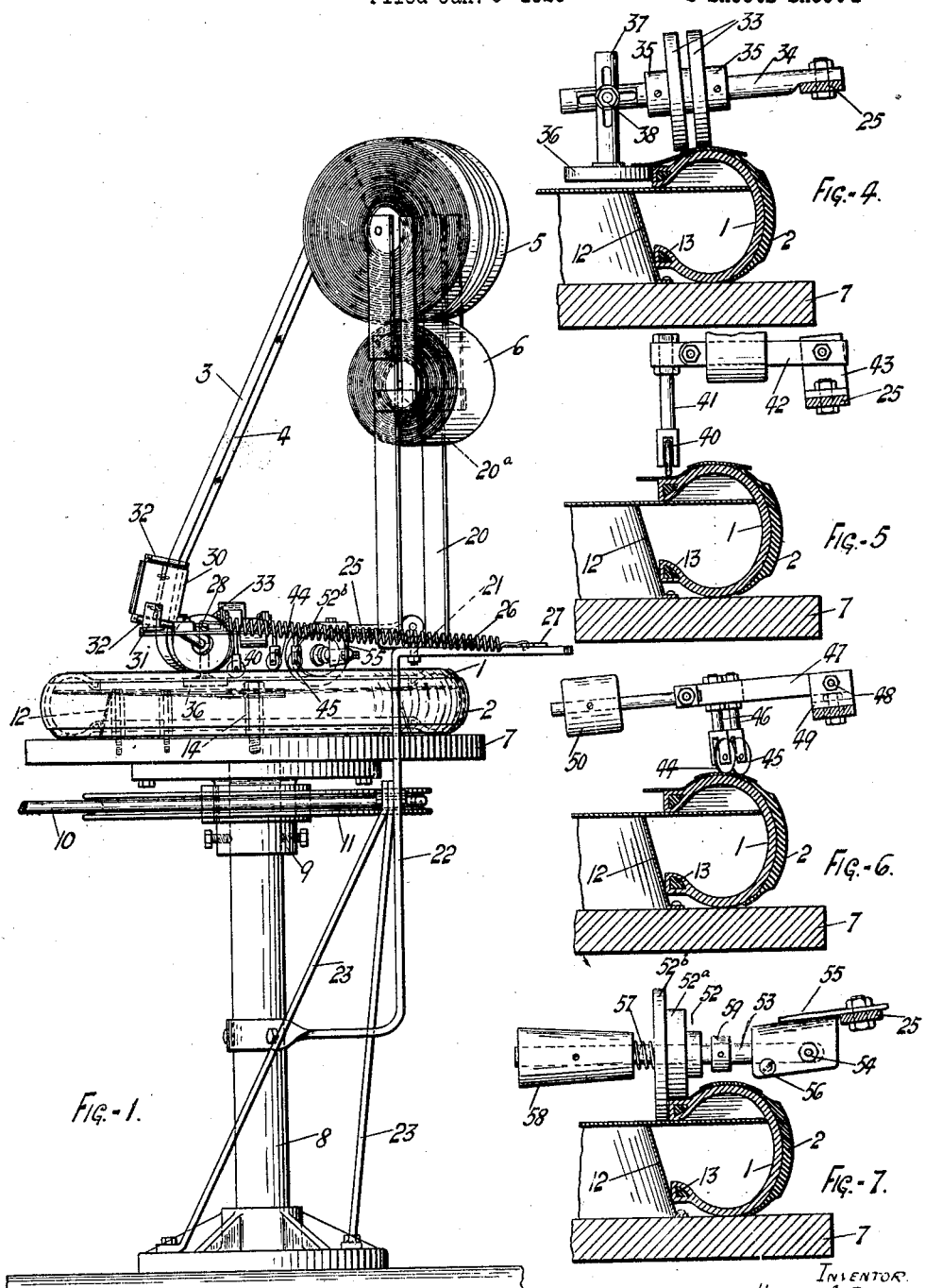

March 27, 1928.
H. A. DENMIRE
1,664,163
TIRE FINISHING MACHINE
Filed Jan. 6 1926
2 Sheets-Sheet 2
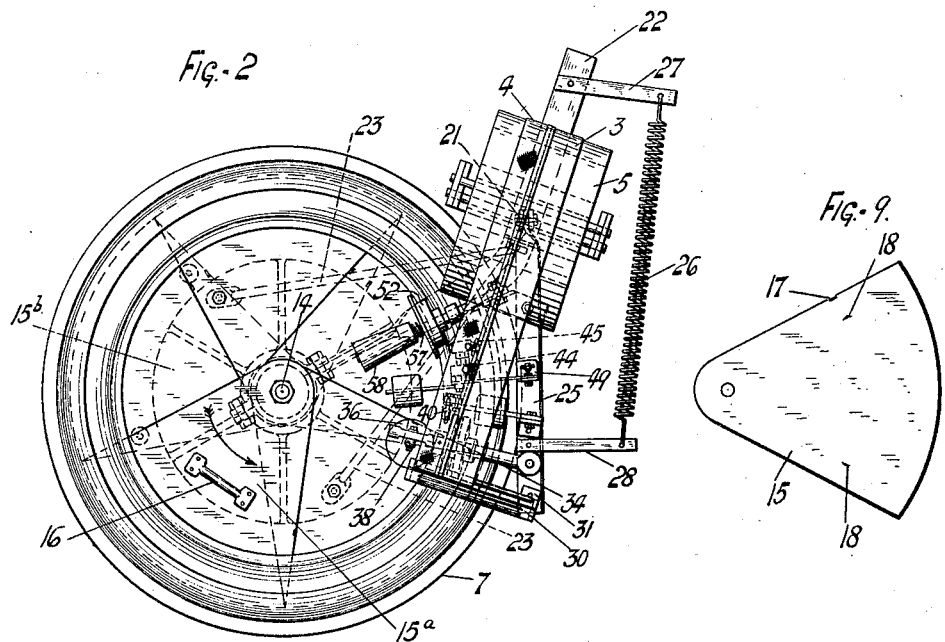
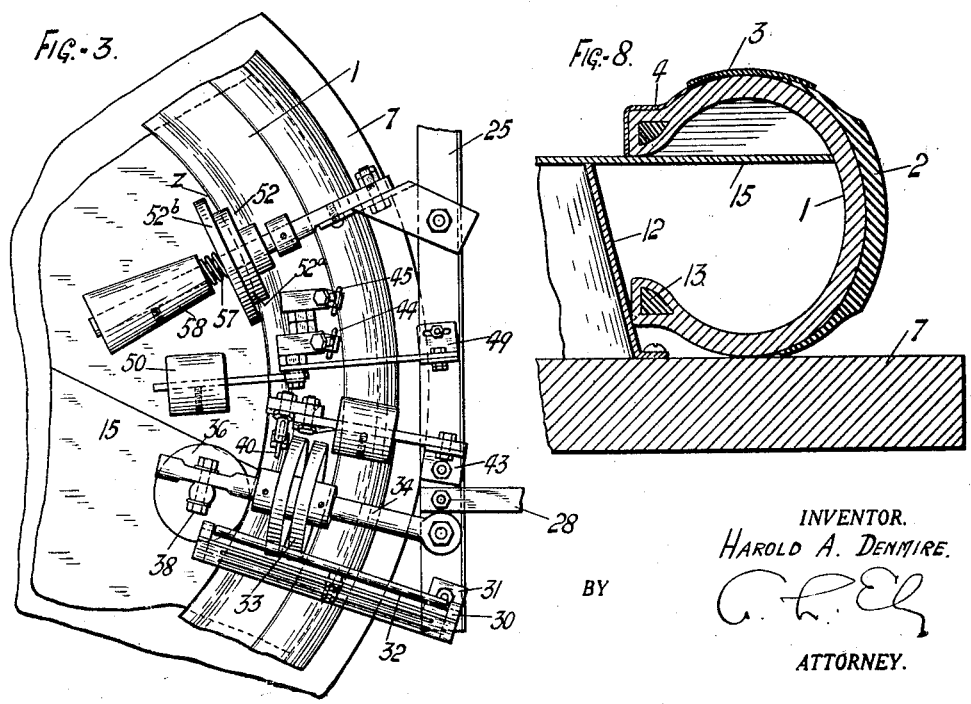
INVENTOR.
HAROLD A. DENMIRE.
BY
ATTORNEY.

Patented Mar. 27, 1928.

1,664,163

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

TIRE-FINISHING MACHINE.

Application filed January 6, 1926. Serial No. 79,702.

The present invention relates to a machine for performing what are known in the trade as the operations of "tire finishing." These operations include the application of various so-called "finishing strips" to the unvulcanized tire casing as it is received from the tire making machine, without a core therein.

The machine which is illustrated here is adapted for the application of the rubber side wall and fabric chafer strip which goes on each side of the tire casing below the tread and about the bead of the tire. Heretofore, the operation of finishing has largely been done by hand, and while machines have been designed to do this work, the machine forming the subject of this application is adapted for quicker and more accurate work than has heretofore been possible.

The features of novelty and advantages of the machine will be clearly pointed out in the specification and shown in the drawings, it being understood that while the description and drawings are quite detailed, many of the details may be changed or modified without departing from the essential features of the invention as set forth in the claims.

In the drawings:

Figure 1 is a side elevation of the machine showing a tire casing in position thereon;

Figure 2 is a plan view;

Figure 3 is an enlarged plan view of the various instrumentalities that shape the finishing strip about the side of the tire;

Figures 4 to 7 inclusive are views illustrating the successive steps in the finishing operation;

Fig. 8 is an enlarged detail of a tire casing with the finishing strip or elements applied to one side thereof; and Figure 9 is a detail of the tire holder.

The apparatus herein illustrated, described and claimed is designed to place a strip of finishing material, including the rubber side wall and rubberized fabric chafer strip, about the sides and around the beads of a tire casing. The tire casing as it is finished upon the tire machine is shown at 1, the tread, which is applied while on the tire machine, being shown at 2. The rubber side wall 3 and the fabric chafer strip 4 are assembled together in a long strip which is furnished to the machine in a roll 5, wound with the usual liner 6.

The tire 1 is supported upon a table 7 which is rotatable upon the upper end of a vertical shaft or standard 8, the height of the table being regulated and adjusted by the adjustable collar 9 at the upper end of the standard. The table is driven by a belt 10 which passes over a pulley 11 secured to the base of the table.

The tire is supported in flat or horizontal position upon the table, being centered thereon by a conical chuck or form 12 against which the inner surface of the lower bead 13 of the tire rests. At the center of the form or holder 12 is located a pin 14 on the upper end of which are pivotally mounted a plurality of sector-shaped plates 15. One of the plates 15ª is provided with a handle 16. The next adjacent plate on the left 15ᵇ is permanently secured to the table. The remaining plates are free to rotate upon the center pin 14. When the plates are all spaced about the form, they constitute a complete disk with the edges of the plates overlapping. The several movable plates are formed with lugs 17 and certain of the plates with small, interengaging punches 18 so that as the plate 15ª is rotated in the direction of the arrow, they are picked up one by one until they all are piled up at one point over the plate 15ᵇ. When the table is in this condition, a tire may be taken off and replaced upon the table. When the plates are rotated in the opposite direction, they are distributed over the table. The arrangement is such that the complete disk enters into the tire casing and supports the upper bead. Obviously when one side of a tire has been "finished," the plates are telescoped and the tire is reversed so that the other bead and side wall may be covered.

The roll of finishing material 5 with the liner 6 wrapped therewith is supported in the upper end of a vertical V-shaped bracket 20, the roll 5 resting upon the usual take-up roll 20ª for the liner. The bracket 20 is supported and swings about a pivot pin 21 at its lower end, the pin being supported on an arm 22 which projects upwardly and outwardly from the supporting shaft 8, being braced by arms 23.

Attached to the bracket 20 is the main horizontal supporting arm 25 which is rigid with the bracket 20. A coil spring 26 connects short arms 27 and 28 carried upon the arm 22 and the arm 25, respectively, and operates to urge the bracket and the arm 25 outwardly from the tire casing at all times, positioning the arm 25 with respect to the tire casing, as will be explained.

The arm 25 overlies the tire casing and carries the various instrumentalities or tools which apply and smooth the finishing elements thereon. It carries a number of arms which in turn support the various finishing rollers which rest upon the tire. The several elements will be described in the order in which they operate upon the finishing strip, beginning with the guiding device at the outer end of the swinging arm 25.

The material, as it leaves the roll 5, passes downwardly toward the tire and first encounters the guiding plate 30, just referred to. This plate is angularly mounted at the extremity of the swinging arm 25, and is movable to the correct angle about the securing bolt 31, so that the finishing strip passes on to the tire at a tangent. The plate carries upper and lower guiding rollers 32 and is adjustable transversely so as to accommodate differing widths of finishing material.

The strip of finishing material passes from the guiding plate to the tire, to which it is initially attached at about its central zone by two rollers 33 (Figure 4) which are rotatable upon an arm 34 projecting from the swinging arm. These rollers are held in their proper location upon the arm between adjustable collars 35. The free end of the arm 34 carries a guide roller 36 mounted upon a vertical axis and arranged to bear against the inner circumference of the bead.

This roller is carried upon a shaft 37 which crosses the end of the arm 34 and adjustable vertically and horizontally by a bolt 38 which passes through slots on the arm 34 and the shaft 37. The weight of the arm and the parts carried thereby is sufficient to press the material in place against the tire. The roller 36 acts as an adjustable stop for limiting the outward swinging movement of the arm 25 under the influence of the spring 26, and accurately positions the various tools so that they are adapted to perform the work for which they are designed.

The next instrumentality encountered by the finishing strip is a roller 40 (Figure 5) which is carried upon a shank 41 mounted on the end of a pivoted and weighted lever 42. The lever 42 is carried upon a bracket 43 which is in turn supported by the swinging arm 25.

The rubber side wall is next attached to the side of the tire and rolled into close adhesive attachment to the edge of the tread by a pair of small rollers 44 and 45 (Figure 6) which are arranged in stepped relation and at a slight angle to the tire as shown in Figure 3. These rollers are carried upon shanks 46 which are secured to a swinging lever 47, pivoted at 48 upon an adjustable bracket 49 which is fastened to the swinging arm 25. A weight 50 is carried upon the outer end of the lever 47 to give the necessary pressure to the rollers 44 and 45.

The rubber side wall and chafer strip are now securely attached to the side of the tire and the outer surface of the bead. The last action of the mechanism is to fold the inner edge of the chafer around the bead and secure it tightly thereto. This is performed by the roller 52 shown in Figure 7, which is formed with one surface $52^a$ adapted to roll on the outside of the bead and with a flange $52^b$ adapted to roll on the underside or inner circumference of the bead. The roller 52 is loosely mounted upon the lever 53 which is pivoted at 54 upon a bracket 55 which is secured to the swinging arm 25, a stop 56 being arranged upon the bracket to limit the downward movement of the lever. The roller 52 is urged against the underside of the bead by a coil spring 57 located between the roller and a weight 58 secured to the outer end of the lever 53. A collar 59 limits the inward movement of the roller 52. It will be observed that the lever 53 is not exactly radial of the core, but is slightly off-center so that only the one edge of the flange $52^b$ bears against the bead, a slight clearance as indicated at Z in Figure 3 being provided between the bead and the other side of the roller. This arrangement is necessary in order to insure the attachment of the fabric chafer strip to the inner circumference of the bead. Were the clearance Z not provided, the upwardly moving side of the flange $52^b$ would tend to strip the chafer off the bead.

It is believed that the operation of the apparatus will have been understood from the description which has been given. The operator places the unfinished tire upon the table 7 over the collapsed cover plate 15. The sectors are then spread out fanwise, entering the tire as shown in the various figures, and serving as a support for the upper bead. The swinging arm 25 is then brought over the tire and the roller 36 placed against the bead. The operator then attaches the leading end of the finishing strip to the tire at a point immediately in the rear of the rollers 33 and the table is started in rotation. The several instrumentalities secure the finishing material to the side of the tire and smooth it in place, the rollers 44 and 45 forming a tight joint at the edge of the tread. When the tire has made a complete revolution, the arm 25 is swung out of the way and the tire is reversed so that the finishing material is applied to the other side of the tire. After the tire leaves the material the operator trims off that part of the side wall which overlies the tread, and the finishing operations are completed.

The apparatus here illustrated and described is a simple and easily operated mechanism for applying the finishing elements to the sides of the tire. The operator of finishing can be easily trained and the finishing can be done perfectly and quickly by unskilled operators. The apparatus also saves material and affords a faster and more accurate means for finishing a tire than the old hand method. Other advantages will be apparent to those skilled in the art.

What is claimed is:

1. In an apparatus for applying a side wall and chafer strip to a tire carcass, a rotatable table for supporting the tire carcass in a horizontal plane, a swinging arm movable above the tire and a plurality of independently pivoted levers on said arm, a finishing tool carried upon each lever, and means for conducting a strip of finishing material to the tire carcass in front of said tools.

2. In an apparatus for applying a side wall and a chafer strip to a tire carcass, a rotatable table for supporting a tire carcass in a horizontal plane, a swinging arm movable over the tire, a plurality of pivoted levers on said arm, and finishing tools carried upon the said levers.

3. In an apparatus for applying finishing elements to a tire carcass, a rotatable table for supporting the tire carcass in a horizontal plane, a swinging frame, means for supplying finishing material carried by the frame, an arm projecting from the frame over the tire, yielding means acting upon the frame, a guide roller bearing against the tire to limit the movement of the frame, and a plurality of finishing tools carried by the arm and adapted to bear on the side of the tire carcass.

4. In an apparatus for applying finishing elements to a tire carcass, a rotatable table for supporting the tire carcass, a swinging frame, means for supplying finishing material carried by the frame, an arm projecting from the frame over the tire, yielding means acting upon the frame to swing it outwardly of the tire, a guide roller carried by the frame and bearing against the inner circumference of the tire, and a plurality of finishing tools carried by the arm and adapted to bear upon the side of the tire carcass.

5. In an apparatus for applying finishing elements to a tire carcass, a rotatable table for supporting the tire carcass, a swinging arm, yielding means acting to move the arm outwardly of the tire, a guide roller on the arm bearing against the inner circumference of the tire bead, and a plurality of finishing tools carried by the arm and adapted to bear upon the side of the tire.

6. In an apparatus for applying finishing elements to a tire carcass, a rotatable table for supporting the tire carcass, a swinging arm movable over the tire, yielding means to move the arm outwardly of the tire, a guide roller on the arm bearing against the inner circumference of the tire bead, and means carried by the arm adapted to bear upon the side of the tire and apply the finishing elements thereto.

7. In an apparatus for applying finishing elements to a tire carcass, a rotatable table for supporting a tire carcass, an arm movable over the tire, yielding means acting upon the arm, a guide bearing against the tire and adapted to limit the movement of the arm, and means carried by the arm adapted to bear upon the side of the tire and apply the finishing elements thereto.

8. In an apparatus for applying finishing elements to a tire carcass removed from the core, a rotatable table, an adjustable support movable to a position within the tire carcass to support a bead of the tire, and a plurality of finishing tools movable to a position over the tire and adapted to bear thereon.

9. In an apparatus for applying finishing elements to a tire carcass removed from the core, a rotatable table, an adjustable support on the table movable to a position within the tire carcass to provide a support for the tire bead, an arm movable over the tire, and a plurality of finishing tools carried by the arm and adapted to bear upon the side of the tire.

10. In an apparatus for applying finishing elements to a tire carcass removed from the core, a rotatable table, a support on the table movable to a position within the tire carcass to provide a support for the tire bead, a swinging arm movable over the tire, a plurality of weighted levers on the arm, and finishing tools on said levers adapted to bear against the side of the tire.

11. In an apparatus for applying finishing elements to a tire carcass removed from the core, a rotatable table, a support on the table movable to a position within the tire carcass to provide a support for the tire bead, a swinging arm movable over the tire, a plurality of weighted levers on the arm, finishing tools on said levers adapted to bear against the side of the tire, a guide roller on the swinging arm adapted to bear against the tire, and yielding means acting on the arm to press the guide roller against the tire.

12. In a tire finishing machine, a table, a centering device on the table over which the tire is placed, and a plate on the centering device adapted to enter the tire and afford a support for the inner surface of a bead of the tire.

13. In a tire finishing machine, a table, a centering device on the table over which the tire is placed, and a plate on the centering device adapted to enter the tire and afford a support for the inner surface of a bead of the tire, said plate being composed of a plurality of movable sectors.

14. In a tire finishing machine, a rotatable table, a centering formation for a tire upon the table, and a plurality of sector-shaped plates adapted, when spread apart, to support the inner surface of the tire bead.

15. In a tire finishing machine, a movable support, means to hold a roll of finishing material carried on the support, a plurality of independently mounted finishing tools also carried by the support and arranged in an arc, and a support for the tire.

16. In a tire finishing machine, a movable support, means to hold a roll of finishing material carried on the support, a plurality of independently mounted finishing tools also carried by the support and arranged in an arc, a support for the tire, and a guide plate on the support for conducting the finishing material to the tire.

17. In a tire finishing machine, a movable support, an arm extending from the support and movable over the tire, and a plurality of finishing tools carried upon the arm, said tools being arranged about the tire and bearing upon the outer surface of the tire in different arcs so that each tool shapes a definite portion of the finishing elements.

18. In a tire finishing machine, a movable support, an arm extending from the support and movable over the tire, means to position the arm with respect to the tire, and a plurality of finishing tools carried upon the arm, said tools being arranged in an arc about the tire, the several tools being located at varying distances from the center of the tire.

19. In a tire finishing machine, an arm adapted to be positioned adjacent a tire, and a plurality of finishing tools carried upon said arm, said tools being movable independently of one another and adapted to bear against the outer surfaces of the tire.

20. In a tire finishing machine, means to support and rotate the tire in a horizontal plane, an arm positionable over the tire, a plurality of finishing tools mounted on said arm, said tools being movable independently of one another, and yielding means operable to force the tools against the outer surface of the tire.

21. In a tire finishing machine, means to support and rotate the tire in a horizontal plane, an arm positionable over the tire, a plurality of finishing tools mounted on said arm, said tools being movable independently of one another, yielding means operable to force the tools against the outer surface of the tire, and guiding means carried by the arm and contacting with the tire.

22. In a tire finishing machine, a rotatable table for supporting a tire, an arm located over the tire, means to position said arm with respect to the tire, and a plurality of finishing tools carried by the arm and adapted to bear against the side of the tire in arcs varying in distance from the center of the tire.

23. In a tire finishing machine, a rotatable table for supporting a tire, an arm located over the tire, means to position said arm with respect to the tire, and a plurality of finishing tools carried by the arm and adapted to bear against the side of the tire, said tools being adapted to apply the side wall to the side of the tire and the chafer strip about the bead.

24. In a tire finishing machine, a rotatable support for a tire carcass, an arm located over the tire, and a plurality of tools carried by said arm and arranged about the tire and each tool adapted to bear in a different arcuate path from the other tools.

25. In a tire finishing machine, a rotatable support for a tire carcass, an arm located over the tire, and a plurality of tools independentlly mounted upon and yieldingly supported by said arm and arranged about the tire and each adapted to bear in a different arcuate path from the other tools.

26. In a tire finishing machine, a rotatable support for a tire carcass, an arm located over the tire, and a plurality of tools carried by said arm and arranged in an arc about the tire, said tools being adapted to apply a side wall and chafer to the sides and about the bead of the tire.

27. In a tire finishing machine, a rotatable support for a tire carcass, an arm located over the tire, and a plurality of of tools independently mounted upon and yieldingly supported by said arm and arranged in an arc about the tire, said tools being adapted to apply a side wall and chafer to the sides and about the bead of the tire.

HAROLD A. DENMIRE.